(12) United States Patent
Jaoui et al.

(10) Patent No.: US 9,416,907 B2
(45) Date of Patent: Aug. 16, 2016

(54) DEVICE AND METHOD FOR PLUGGING AN END OF A CONDUIT

(71) Applicant: DASSAULT AVIATION, Paris (FR)

(72) Inventors: Pascal Jaoui, Les Alluets le Roi (FR); Pascal Babaz, St. Martin Bellevue (FR); Yannick Cohen, Meythet (FR)

(73) Assignee: DASSAULT AVIATION, Paris (FR)

( * ) Notice: Subject to any disclaimer, the term of this patent is extended or adjusted under 35 U.S.C. 154(b) by 16 days.

(21) Appl. No.: 14/526,138

(22) Filed: Oct. 28, 2014

(65) Prior Publication Data
US 2015/0114983 A1    Apr. 30, 2015

(30) Foreign Application Priority Data
Oct. 30, 2013  (FR) ...................................... 13 02519

(51) Int. Cl.
*F16L 55/128* (2006.01)
*B23P 19/02* (2006.01)
*F16L 55/11* (2006.01)
*B25B 27/10* (2006.01)

(52) U.S. Cl.
CPC ............... *F16L 55/128* (2013.01); *B23P 19/02* (2013.01); *B25B 27/10* (2013.01); *F16L 55/11* (2013.01)

(58) Field of Classification Search
CPC ............................. F16L 55/13; F16B 19/1081
USPC ......... 138/89; 220/233–236, 801; 411/34, 43, 411/45; 29/522.1
See application file for complete search history.

(56) References Cited

U.S. PATENT DOCUMENTS

| | | | | |
|---|---|---|---|---|
| 1,644,118 A | | 10/1927 | Florence | |
| 2,292,467 A | * | 8/1942 | Norsell | F16B 19/1081 16/386 |
| 3,135,414 A | * | 6/1964 | Lee, II | F16J 13/02 138/89 |
| 3,451,583 A | * | 6/1969 | Lee | F16J 13/02 138/89 |
| 3,825,146 A | * | 7/1974 | Hirmann | B65D 39/12 138/89 |

(Continued)

FOREIGN PATENT DOCUMENTS

DE  12 45 658 B   7/1967
DE  39 11 033 A1  10/1990

(Continued)

*Primary Examiner* — Patrick F Brinson
(74) *Attorney, Agent, or Firm* — Davidson, Davidson & Kappel, LLC (57) ABSTRACT

A plugging device for plugging an end of a conduit is provided. The plugging device includes a sealing plug to the end of the conduit, and a pin intended to be axially driven into the bore of the socket for ensuring a sealing contact between the socket and the end, comprises a driver able to drive the pin into the bore of the socket. The plugging device further includes a determiner configured to determine an instantaneous axial position of the pin relatively to the socket as the pin is gradually driven into the bore of the socket by the driver. A method for plugging an end of a conduit is also provided.

13 Claims, 6 Drawing Sheets

(56) References Cited

U.S. PATENT DOCUMENTS

| | | | | |
|---|---|---|---|---|
| 4,369,662 A | * | 1/1983 | Rieben | F22B 37/003 138/89 |
| 4,390,042 A | * | 6/1983 | Kucherer | F16L 55/13 138/89 |
| 4,575,185 A | | 3/1986 | Wentzell et al. | |
| 4,867,333 A | * | 9/1989 | Kolp, Jr. | F16L 55/13 220/234 |
| 5,078,294 A | * | 1/1992 | Staubli | F16B 13/065 220/233 |
| 5,160,226 A | * | 11/1992 | Lee, II | F16L 55/13 411/45 |
| 5,195,588 A | | 3/1993 | Dave | |
| 5,664,328 A | * | 9/1997 | Fink | B23P 19/025 138/89 |
| 5,779,085 A | * | 7/1998 | Havlinek | F16L 55/11 215/361 |
| 5,944,057 A | * | 8/1999 | Pierce | F16L 55/1141 138/89 |
| 7,588,052 B2 | * | 9/2009 | Reuter | F15B 13/0807 138/89 |
| 7,631,664 B1 | * | 12/2009 | Mailand | F16L 55/1108 138/89 |
| 8,556,102 B2 | * | 10/2013 | Hersant | F16L 55/13 220/233 |

FOREIGN PATENT DOCUMENTS

| | | |
|---|---|---|
| EP | 0 288 719 A2 | 11/1988 |
| EP | 0 914 900 A2 | 5/1999 |
| FR | 2 628 671 A1 | 9/1989 |
| GB | 2 016 172 A | 9/1989 |
| GB | 2 365 103 A | 2/2002 |
| GB | 2 404 208 A | 1/2005 |

* cited by examiner

DEVICE AND METHOD FOR PLUGGING AN END OF A CONDUIT

This claims the benefit of French Patent Application FR 13 02519, filed Oct. 30, 2013 and hereby incorporated by reference herein.

The present invention relates to a device for plugging an end of a conduit with a sealing plug comprising a tubular socket provided with an axial bore, inserted beforehand into the end of the conduit, and a pin intended to be axially driven into the bore of the socket in order to ensure a sealing contact between the socket and the end, the plugging device comprising specific driver for driving the pin into the bore of the socket.

In particular, it applies to the plugging of a hydraulic conduit of a hydraulic system, notably in an aircraft.

Such a hydraulic system actually comprises frequently one or several conduits opening out, for which it is necessary to sealably obturate the end.

BACKGROUND

In order to achieve this plugging, the use of plugs comprising a socket intended to be axially inserted into the bore of the conduit on the one hand and a pin able to be inserted into the inside of the socket so as to produce expansion of the socket in the bore of the conduit, on the other hand, is known and thus ensuring firm and sealed maintaining of the whole of the plug in the conduit.

Such plugs are for example marketed by LEE COMPANY.

The setting into place of such a plug is achieved by inserting in a first phase the socket into the bore of the conduit and then by driving the pin into the socket until this plug attains a determined depth, i.e., a determined axial position relatively to the socket.

The driving-in of the pin into the socket is for example applied by means of a driving-in jet and of a hammer. The pin is thus driven in by successive pulses applied by the hammer onto the pin via the jet.

However, the jet may cause, by re-bouncing, damages on the hydraulic body, the socket and the pin and thus generate defects.

Alternatively, the driving of the pin into the socket may be applied by means of a press provided with a pusher. The pin is thus gradually driven in by applying the pusher against the pin and by applying pressure on the pin via the pusher by actuating the press.

The final depth of the pin should be as close as possible to the desired depth. Indeed, insufficient driving of the pin into the socket may result in a poor seal, and therefore cause leaks of the conduit, while excessive driving-in may cause deterioration of the bore of the conduit and of the socket.

In order to control the axial position of the pin relatively to the socket, the use of a gauge with a comparator is known. This gauge is set into place between two successive operations for driving in the pin with the jet or the pusher, until the value measured by the gauge attains or approaches the desired value.

This control method does not give entire satisfaction.

SUMMARY OF THE INVENTION

Indeed, such a method requires performing a succession of sequences for driving in the pin and controlling its position, and therefore proves to be long and tedious.

Further, this method only allows one-off determination of the position of the pin, and therefore does not give the possibility of avoiding excessive driving of the pin into the socket between two measurement operations.

Now, such excessive driving-in imposes withdrawal of the conduit of the assembly of the plug, and that a new plug be laid in the conduit by resuming from the start the operations for inserting the socket and for driving in the pin.

Moreover, when the driving-in of the pin into the socket is applied by means of a press provided with a pusher, the position of the pin is estimated by locating an initial position of the pusher, in which this pusher bears against an upper edge of the socket, and then by measuring, between two successive driving-in operations, the position of the pusher relatively to this initial position.

Now, this measurement may be distorted by deformations of the press and of the body subject to forces, and is therefore not representative of the actual position of the pin relatively to the socket.

The object of the invention is therefore to solve the drawbacks mentioned above, and to propose a device for plugging an end of a conduit by means of a sealing plug with which an optimum seal of the plugged conduit may be obtained.

For this purpose, a plugging device is provided including a determiner able to determine an instantaneous axial position of the pin relatively to the socket during the gradual driving of the pin into the bore of the socket by the driver.

According to other aspects of the invention, the device comprises one or several of the following features:

- the driver comprise a supporting body able to be maintained in a fixed position relatively to the socket;
- the driver comprise a pusher able to be driven into translation along the axial direction by means of a press, the pusher being able to exert pressure on the pin so as to generate an axial movement of the pin;
- the determiner is able to measure a displacement of the pusher relatively to the supporting body as the pin is gradually driven into the bore of the socket;
- the determiner comprises a displacement sensor able to determine a displacement of the pusher relatively to the supporting body as the pin is gradually driven into the bore of the socket;
- that the driver further comprise a press nose able to be actuated by the press in order to drive the pusher into axial translation, the press nose including an axial cavity in which is housed the displacement sensor;
- the plugging device further includes a centerer able to determine a radial position of the pusher relatively to the pin;
- the pusher includes an axial channel, and the centerer include a fiberscope received in the channel;
- the centerer includes a camera able to acquire an image of the end of the conduit;
- the centerer is able to compare the instantaneous radial position of the pusher relatively to the pin with a radial set position and to control a radial displacement of the press depending on the distance between the instantaneous radial position and the radial set position;
- the determiner is able to compare the instantaneous axial position of the pin relatively to the socket with a set position and to control the actuation of the press depending on the distance between the instantaneous axial position and the set position.

A method is also provided for plugging an end of a conduit with a sealing plug comprising a tubular socket provided with an axial bore, inserted beforehand into the end of the conduit, and a pin intended to be axially driven into the bore of the socket in order to ensure a sealing contact between the socket and the end, the method comprising a step for driving the pin into the bore of the socket, the method being characterized in that it further includes determination of an instantaneous axial position of the pin relatively to the socket, applied as the pin is gradually driven into the bore of the socket.

The method may include a step for comparing the instantaneous axial position with a set position value, and in that the driving-in step is applied as long as the instantaneous axial position differs from a predetermined set position value.

BRIEF SUMMARY OF THE DRAWINGS

The invention will be better understood upon reading the description which follows, only given as an example and made with reference to the appended figures wherein.

DETAILED DESCRIPTION

Figure 1:
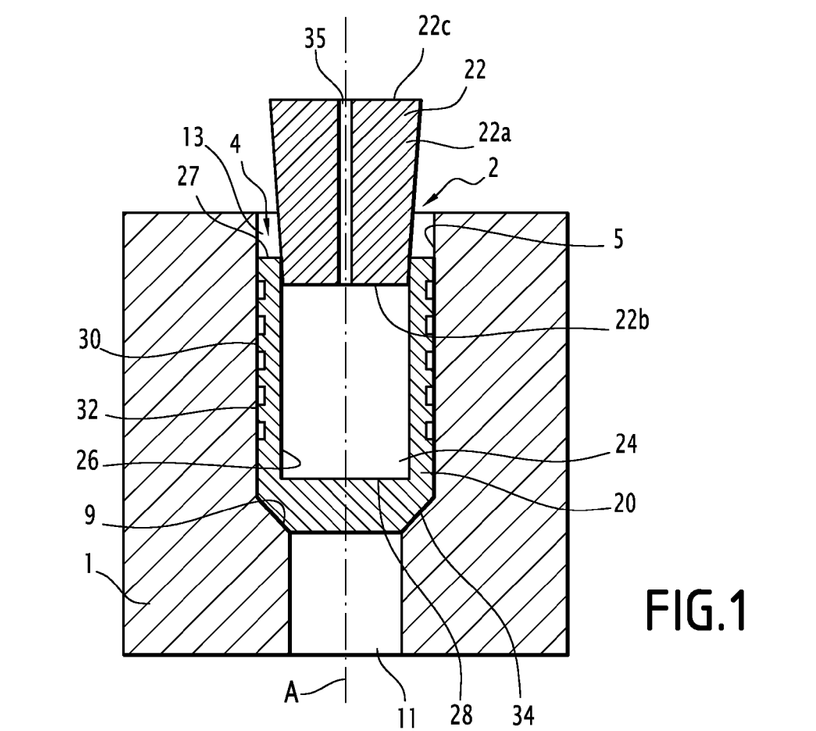
FIG. 1 is a view along an axial section of a portion of a conduit provided with a plug, in an intermediate mounting position of the plug in the conduit.
Figure 2:
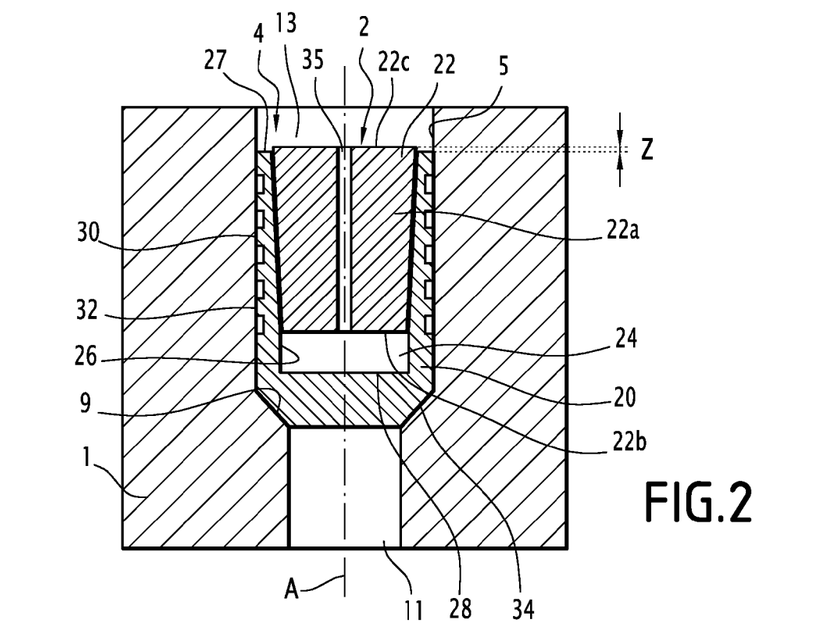
FIG. 2 is a view along an axial section of the conduit portion according to FIG. 1, in a position of plugging of the conduit with the plug.

In FIGS. 1 and 2, a sectional view of an end of a hydraulic conduit 1 provided with a plug 2 is illustrated.

The conduit 1 is of a tubular shape around an axis A. It includes, on the side of its aperture 4, a cylindrical internal wall 5.

The conduit 1 has a circular cross-section widening towards the aperture 4 of the conduit 1 by forming an abutment shoulder 9. The conduit 1 thus has towards the aperture 4, a first section 11 with a diameter d1 followed by a second section 13 with a diameter d2 greater than d1. The second section 13 will also be subsequently called an end of the conduit 1.

In all of the following, the selected orientations are indicative and are meant relatively to FIGS. 1 to 8. In particular, the terms of "upper", "lower", "top", "low", are meant relatively to the selected orientation in the Figures.

The plug 2 includes a socket 20 and a pin 22.

The socket 20 is a cylindrical body intended to be inserted into the end 13 of the conduit 1. The socket 20 includes a substantially cylindrical axial bore 24. The bore 24 is intended to open out outwards from the conduit 1 when the socket 20 is in position in the conduit 1.

The bore 24, in the body of the socket 20, delimits a sidewall 26, which ends on one side with a transverse edge 27, and on the other side with a bottom 28.

The sidewall 26 is of an annular shape around an axis coinciding with the axis A of the conduit 1 when the socket 20 is in position in the conduit 1. The outer surface 30 of the sidewall 26 has a diameter substantially equal to the diameter of the end 13 of the conduit 1.

The outer surface 30 of the sidewall 26 comprises a plurality of annular grooves 32, intended to allow anchoring of the socket 20 and ensuring the seal of the sidewall 26 upon inserting the pin 22 into the bore 24.

The bottom 28, with a circular shape, closes the socket 20 on the side of the latter which is intended to be inserted into the inside of the conduit 1. The outer surface 32 of the bottom 28 includes a frusto-conical annular portion 34 able to bear against the abutment shoulder 9 of the conduit 1 when the socket 20 is inserted into the conduit 24.

The pin 22 is a body of a general frusto-conical shape, able to be driven into the bore 24 of the socket 20.

The pin 22 includes a frusto-conical lateral surface 22a, as well as a lower wall 22b and an upper wall 22c intended to be respectively oriented inwards and outwards from the bore 24 upon inserting the pin 22 into the socket 20.

The lateral surface 22a of the pin 22 is able to exert pressure against the lateral wall 26 of the socket 20 upon its driving into the bore 24 of the socket 20. Under this pressure, the sidewall 26 elastically deforms so as to bear against the internal wall 5 of the end 13 of the conduit 1, ensuring a sealing contact between both of these walls.

The distance z along the axis A between the upper wall 22c of the pin 22 and the transverse edge 27 of the socket 20 will subsequently be called the depth of the pin 22 relatively to the socket 20.

The pin 22 includes a ventilation hole 35 intended for allowing discharge of the compressed air between the socket and the pin.

The pin 22 is able to be driven into the socket 20 along the axis A between an initial insertion position illustrated in FIG. 1 and a final radial expansion position illustrated in FIG. 2.

In the radial expansion position, the pin 22 radially moves the socket 20 away from the axis A as specified above.

The pin 22 is thus able to ensure a sealing contact between the socket 20 and the internal wall 5 of the conduit 1.

Figure 3:
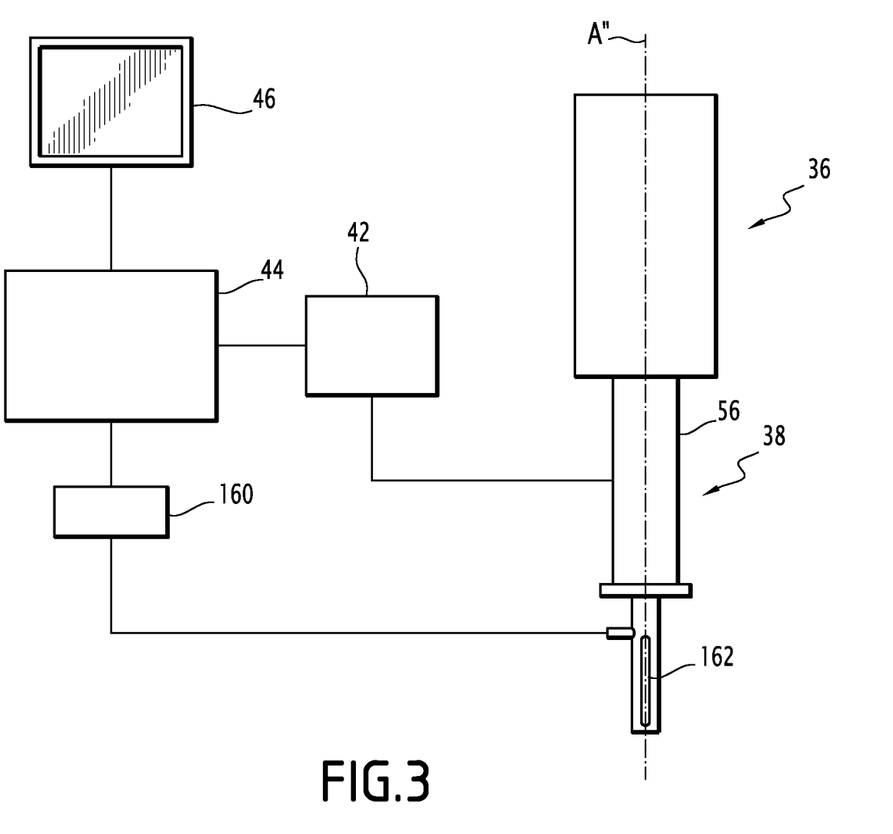
FIG. 3 is a schematic view of a plugging device according to an embodiment of the invention.

A plugging device 36 according to an embodiment of the invention is schematically illustrated in FIG. 3, for plugging an end 13 of the conduit 1 by means of a sealing plug as illustrated in FIGS. 1 and 2.

The plugging device 36 comprises driver 38 able to drive the pin 22 into the bore 24 of the socket 20. The socket 20 is inserted into the conduit 1 beforehand until the frusto-conical annular portion 34 bears against the abutment shoulder 9 of the conduit 1.

The plugging device 36 further includes a determiner for determining the axial position of the pin 22 relatively to the socket 20 as it is gradually driven into the bore 24 of the socket 20, as well as a center for centering the driver 38 relatively to the pin 22.

The device 36 moreover comprises a processor 42 for processing the information relating to the axial position of the pin, a computer 44 connected to the camera 160 and to the processor 42 and a display device 46, for example a screen.

Figure 4:
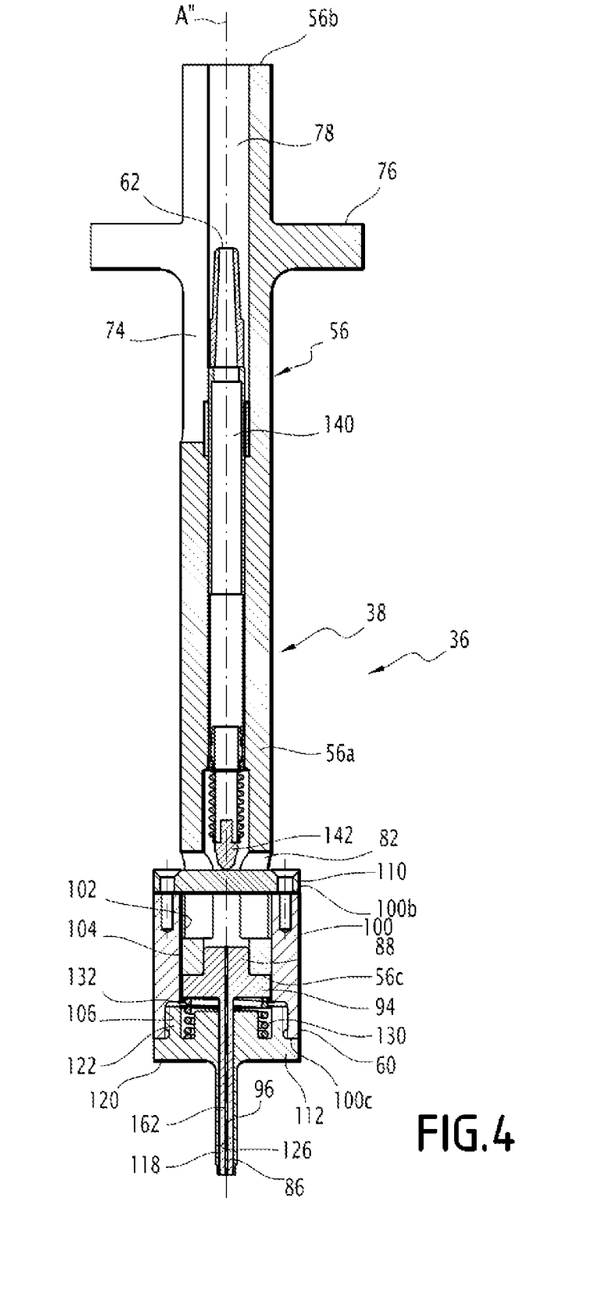
FIG. 4 is a view according to a first axial section of a portion of the plugging device of FIG. 3.
Figure 5:
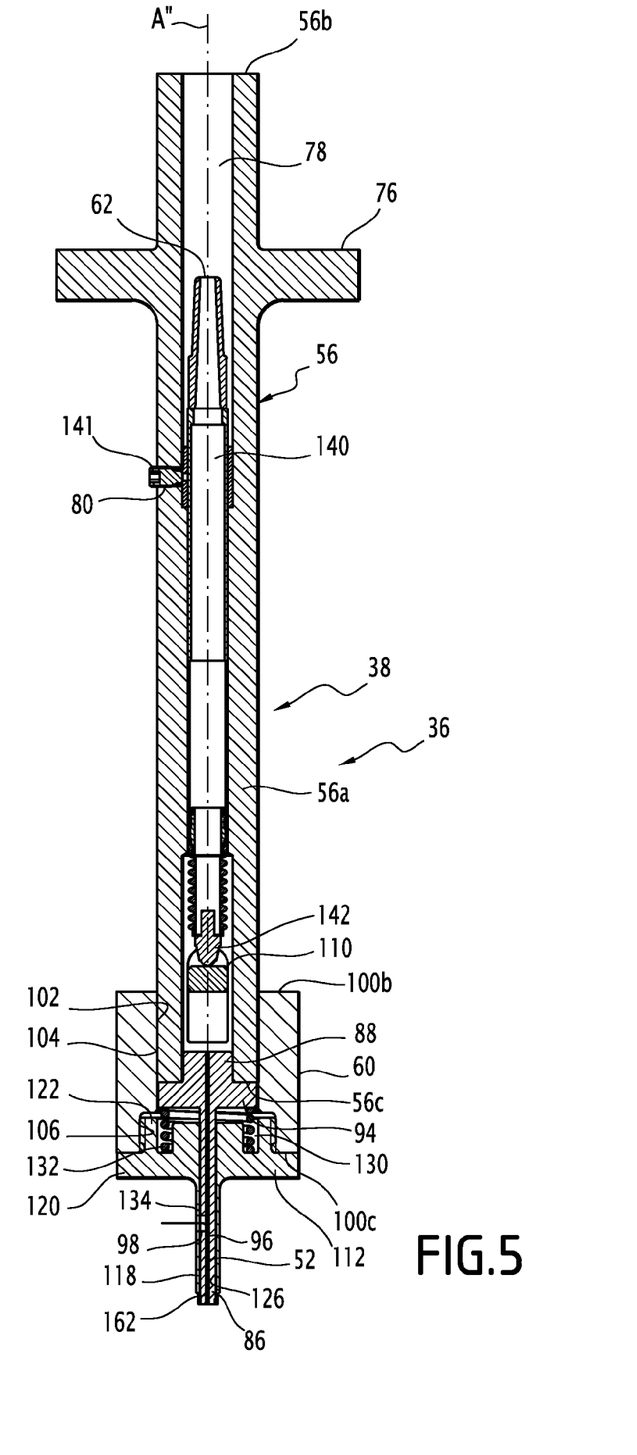
FIG. 5 is a view similar to FIG. 4, along a second axial section orthogonal to the first axial section, of the plugging device of FIG. 3.

In FIGS. 4 and 5, a view along an axial section of a portion of the plugging device 36 of FIG. 3 is illustrated including a driver 38, a determiner for determining the axial position of the pin 22 and a centerer.

The driver 38 comprise a pusher 52 and a press nose 56.

The determiner for determining the axial position of the pin 22 comprise a supporting body 60, mounted on the press nose 56 and intended to be inserted between the press nose 56 and the socket 20, and a displacement sensor 62, able to determine a displacement of the press nose 56 relatively to the supporting body 60 in order to infer therefrom the displacement of the pusher 52 relatively to the socket 20.

The press nose 56 is able to be mounted on a slide of a press and to drive the pusher 52 into axial translation in order to drive the pin 22 into the bore 24 of the socket 20.

The press is for example a manual press, able to be actuated by a user by means of a rotary wheel, the rotation of this rotary wheel driving the press nose 56 into axial translation.

The press nose 56 is a hollow body with a general tubular shape around an axis A". It thus includes a sidewall 56a ending with its lower and upper ends 56b and 56c.

The upper end of the press nose 56 is intended to be mounted on the slide of the press. The upper end thus includes a diametrical slot 74, visible in FIG. 4, intended for letting through the cable of the sensor 62, as well as a transverse flange 76, crossed by the slot 74, adapted so as to be attached to this slide.

The press nose 56 is thus able to be driven into translation by the press along the axis A".

The press nose 56 includes, over the whole of its length, a cavity 78 centered around the axis A". The cavity 78 is cylindrical. The cavity 78 receives the displacement sensor 62.

Moreover, the press nose 56 includes a radial bore 80, visible in FIG. 5, crossing the sidewall 56a, so as to allow the passing of a fixing screw 141 for attachment of the displacement sensor 62 to the press nose 56 via a ring.

Further, the lower end of the press nose 56 includes a diametrical slot 82, visible in FIG. 4, intended for letting through a platelet 110 of the supporting body 60 and for blocking in rotation around the A" the supporting body 60 relatively to the press nose 56.

The slots 74 and 82 are for example aligned parallel to the axis A".

The pusher 52 is able to be actuated by a press, via the press nose 56, in order to exert pressure against the pin 22 and via the latter into the bore 24 of the socket 20.

The pusher 52 thus comprises a lower segment forming a rod 86, the lower free end of which is intended to be applied upon the pin 22.

The pusher 52 moreover comprises an upper segment 88 engaged into the cavity 78 of the press nose 56, and a flange 94 transversely protruding between the rod 86 and the upper segment 88, bearing against the lower transverse edge 56c of the press nose 56.

The outer diameter of the upper segment 88 is thus adapted so as to be received by fitting into the lower end of the cavity 78.

The outer diameter of the flange 94 is substantially equal to the outer diameter of the sidewall 56a of the press nose 56.

The pusher 52 further comprises an axial channel 96 crossing the rod 86, forming a ventilation hole, as well as a housing for a fiberscope 98, as visible in FIG. 5.

The press nose 56 is able to exert axial pressure against the pusher 52 by having the lower end 56c bear against the flange 94. Thus, the pusher 52 is able to be driven into translation by the press nose 56 along the axis A".

The supporting body 60 comprises a sheath 100 with the general shape of a hollow cylinder. The sheath 100 ends at its lower and upper ends with an upper transverse edge 100b and a lower transverse edge 100c, respectively.

The sheath 100 includes a cylindrical bore 102, coaxial with the cavity 78 of the press nose 56.

This bore 102 includes a circular cross-section widening downwards. The bore 102 thus has an upper segment 104 with an inner diameter substantially equal to the outer diameter of the sidewall 56a of the press nose 56, followed by a lower segment 106 of larger diameter.

The inner wall of the lower segment 106 is threaded.

The sheath 100 is slidably mounted parallel to the axis A" around the lower end of the press nose 56 and of the pusher 52. In particular, the sheath 100 is mounted so that the lower end 56c of the press nose 56 and the flange 94 are guided by the lower wall of the upper portion 104.

Further, the sheath 100 is blocked in rotation around the axis A" relatively to the press nose 56.

The sheath 100 actually comprises a platelet 110 which may be disassembled, here attached by screwing onto the upper transverse edge 100b of the sheath 100. This platelet is housed in the slot 82 of the press nose 56 by diametrically crossing the press nose 56.

The width of the platelet 110 is substantially equal to the width of the slot 82, so that the platelet 100 maintains the sheath 100 secured to the press nose 56 rotating around the axis A". Nevertheless, the platelet 110 is free to slide in the slot 82, allowing axial sliding of the sheath 100 relatively to the press nose 56.

The supporting body 60 moreover comprises a supporting part 112 immobilized under the sheath 100 and intended to be radially inserted between the pusher 52 and the socket 20.

This supporting part 112 includes a lower portion 118 for guiding the rod 86, a flange 120, and a head 122 for attachment to the sheath 100.

The supporting part 112 includes a central through-bore 126, centered around the axis A". The inner diameter of the central bore 126 is substantially equal to the outer diameter of the rod 86, so that the rod 86, received in this bore 126 is able to axially slide along the axis A" relatively to the supporting part 112.

The attachment head 122 is of a general cylindrical shape. It includes on its outer lateral surface a threading matching the threading of the lower segment 106 of the sheath 100. The attachment head 122 is thus attached by screwing it into the lower segment 106 of the sheath 100.

The attachment head 122 further includes an annular cavity 130 centered around the axis A", in which a helical spring 132 is housed. The cavity 130 opens out upwards.

The flange 120 radially protrudes between the attachment head 122 and the guiding portion 118.

The guiding portion 118 is of an elongated tubular shape. It forms a guide for the rod 86 during its sliding along the axis A". It includes at its lower end an annular edge intended to bear against the socket 20.

The plugging device 36 is mounted by inserting the pusher 52 into the bore 102 of the sheath 100, the rod 86 being inserted into the guiding portion 118 and the flange 94 of the pusher 52 bearing upon the spring 132. The pusher 52, the press nose 56 and the supporting body 60 are then coaxially aligned around the axis A".

Moreover, the press nose 56 is received into the bore 102 of the sheath, its lower transverse edge 56c bearing against the flange 94 and the platelet 110 being housed in the slot 82.

When the device 36 is mounted in this way, the press nose 56 is able to axially slide relatively to the supporting body 60, while remaining fixed in rotation around the axis A" relatively to the supporting body 60.

During sliding of the press nose 56 downwards, the press nose 56 exerts a force on the pusher 52 and drives the latter into translation along the axis A" downwards relatively to the supporting body 60, this movement causing compression of the spring 132 and a force on the socket 20.

Conversely, during sliding of the press nose 56 upwards, the spring 132 is released and exerts a force between the pusher 52 and the supporting body 60, along the axis A", this force maintaining the pusher 52 flattened against the press nose 56.

The displacement sensor 62 is received in the cavity 78 of the press nose 56.

The displacement sensor 62 includes an upper body 140, maintained secured to the press nose 56 by means of a ring and of a fixing screw 141 crossing the radial bore 80.

The displacement sensor 62 further includes, at its lower end, a feeler 142 actually protruding downwards from the upper body 140. The feeler 142 is able to slide along the axis A" inside the body 140 of the sensor.

The feeler 142 is maintained against the upper surface of the platelet 110 by means of a spring internal to the sensor. When the feeler 142 is thus bearing against the upper surface of the platelet 110, it remains fixed relatively to the supporting body 60 during a downward translational movement of the press nose 56 and of the body 140 of the sensor.

The travel of the feeler 142 is less than the travel of the supporting body 60.

The displacement sensor 62 is moreover connected to the processor 42, for example by means of an electric cable received in the cavity 78.

The displacement sensor 62 is able to determine the instantaneous position of the feeler 142 relatively to the body 140 of the sensor, and to transmit a signal representative of this position to the processor 42.

The centerer comprises a camera 160 and a fiberscope 162 as visible in FIG. 3.

A first end of the fiberscope 162 is connected to the camera 160. The second end of the fiberscope 162 is inserted into the inside of the axial channel 96 of the pusher 52, parallel to the axis A". This second end is oriented downwards, so as to allow viewing with the camera 160, of the pin 22, of the socket 20 and of the end 13 of the conduit 1 when the pusher 52 is positioned plumb with the pin 22.

The camera 160 is able to acquire at each instance an image of the pin 22, of the socket 20 and of the end 13 of the conduit 1 when the pusher 52 is positioned plumb with the pin 22, and to transmit this image to the computer 44.

The processor 42 is able to receive and process the position information from the displacement sensor 62, and to infer therefrom the depth of the pin 22 relatively to the socket.

In particular, the processor 42 is able to determine, from the instantaneous position of the feeler 142 relatively to the body 140 of the sensor, the instantaneous depth of the pin 22 relatively to the socket 20, as described hereafter.

Moreover, the computer 44 is able to receive and to process images from the camera 160, and to infer therefrom the radial position of the pusher 52 relatively to the conduit 1 and to the pin 22, in order to localize possible decentering between the axis A and A" of the conduit 1 and of the pusher 52.

The computer 44 is thus able to localize, from each image received from the camera 160, the contours of the pin 22, of the socket 20 and of the end 13 of the conduit 1. The computer 44 is also able to determine, from these contours, the position of the axis A of the conduit 1 and of the pin 22, and to determine this position with the position of the axis A" of the pusher, in order to infer therefrom a possible shift between both of these axes.

Moreover, the display device 46 is able to display, at each instant, the image from the camera 160 illustrating the contours of the pin 22, of the socket 20 and of the end 13 of the conduit (axis A), to which is superposed a pre-recorded reference image representative of the axis A" of the device 36.

The centerer thus allow a user to check the coaxiality of the axis A" of device 36 with the axis A of the conduit 1 and of the plug 2.

The press nose 56 is translationally movable along the axis A" relatively to the supporting body 60 on a first inactive travel in which the sensor 62 is at rest and then on a second active travel in which the sensor 62 is active.

During the first travel, when the press nose 56, under the action of the press, slides downwards relatively to the supporting body 60, it drives the pusher 52 downwards relatively to the supporting body 60, causing a compression of the spring 132.

Moreover, during this displacement, the press nose 56 drives the feeler 142 and the body 140 of the sensor up to a rated state in which the feeler 142 is in contact with the platelet 110.

From this rated position for activating the sensor 62, the displacement sensor 62 is active.

Indeed, during the second travel, when the press nose 56 slides further downwards relatively to the supporting body 60, it drives into translation the body 140 of the sensor, the feeler 142 remaining, bearing against the platelet 110. The relative movement of the body 140 of the sensor relatively to the feeler 142 causes a compression of the spring of the displacement sensor 62.

During this movement, the displacement sensor 62 measures at each instant the relative position of the feeler 142 relatively to the body 140 of the sensor, and transmits to the processor 42 a signal representative of this position.

During the displacement of the press nose 56, the respective movements of the upper body 140, of the press nose 56 and of the pusher 52 are related. Moreover, the feeler 142 remains bearing against the platelet 110, therefore remains fixed relatively to the supporting body 60.

Thus, the relative displacement of the feeler 142 relatively to the body 140 of the sensor relatively to the rated position is equal to the relative displacement of the pusher 52 relatively to the supporting body 60 from this rated state.

Thus, from the relative position of the feeler 142 relatively to the upper body 140, transmitted at each instant by the displacement sensor 62, the computer 44 at each instant infers the relative displacement of the pusher 52 relatively to the supporting body 60 from the rated position.

Also, when the press nose 56 is raised, it drives into rotation the upper body 140, while the feeler 142 remains bearing against the platelet 110 until the rated state is again attained. The relative movement of the body 140 of the sensor relatively to the feeler 142 causes release of the spring of the displacement sensor 62. When the feeler 142 attains its maximum travel, the feeler 142 is driven by the upper body into translation upwards.

Moreover, the spring 132 is released and maintains the flange 94 bearing against the lower edge 56c of the press nose 56.

Thus, when the press nose 56 is raised, and as long as the rated position is not attained, the respective movements of the body 140 of the sensor, of the press nose 56 and of the pusher 52 are interdependent with each other, and the feeler 142 remains in contact with the supporting body 60.

As indicated above, the processor 42 at each instant infers the relative displacement of the pusher 52 relatively to the supporting body 60 relatively to the rated state.

The plugging device 36 may be used with different types of plugs, of variable diameter and length, in particular by selecting a supporting part 112 and a pusher 52 with a diameter and length adapted to the type of plug to be laid. The supporting part 112 and the pusher 52 may actually be disassembled by unscrewing the supporting part 112 from the sheath 100, and be thereby replaced, between two operations for placing a first and second plug of different types, with a supporting part 112 and a pusher 52 adapted to the second plug.

The main steps for applying the plugging device 36 will now be described for plugging the end 13 of the conduit 1 by means of the plug 2, the socket 20 having been inserted beforehand into this end 13.

The plugging of the end 13 of the conduit 1 is achieved by axially driving the pin 22 into the bore 24 of the socket 20 by means of the device 36, while gradually controlling during its driving-in, the depth of the pin 22, until the desired depth is attained.

The position of the displacement sensor 62 in the press nose 56, the relative dimensions of the pusher 52 and of the guiding portion 118, are selected so that during the driving-in of the pin 22 by the pusher 52, i.e., between the depth of the beginning of the driving-in of the pin 22 and the final desired depth, the driving-in sensor 62 is active.

Further, the pusher 52 and the supporting part 112 are selected depending on the type of plug, notably depending on the diameter and on the length of the plug 2.

In particular, the supporting part 112 is selected so that the lower annular edge of the guiding portion 118 may bear against the transverse edge 27a of the socket 20. Further, the pusher 52 is selected with an external diameter substantially equal to the diameter of the pin 22.

Moreover, the lengths of the pusher 52 and of the supporting part 112 are selected so that the travel of the pusher 52 allows the pin 22 to be driven in as far as the desired depth.

In a calibration step, the press nose 56 of the device 36 is mounted on the slide of a press, and the position of the pusher 52 corresponding to zero depth of the pin 22 is localized and recorded.

Figure 6:
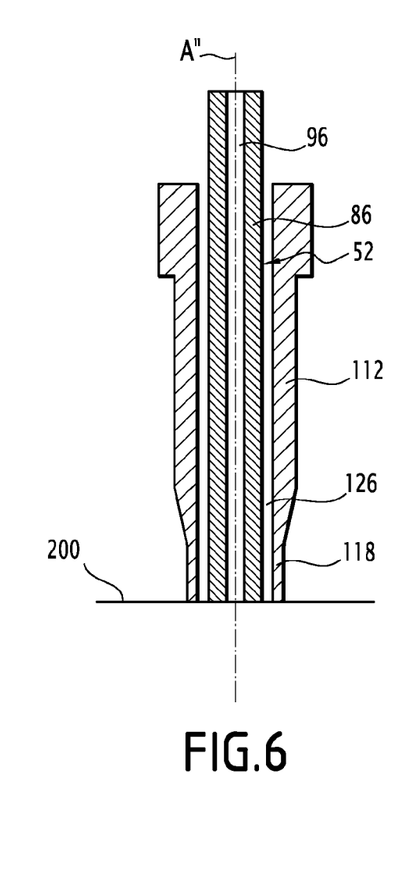
FIGS. 6 to 8 schematically illustrate steps of the method according to the invention.

For this purpose, as schematically illustrated in the FIG. 6, the user has the supporting part 112 bearing upon a hard planar surface 200, for example marble, and actuates the press for driving the pusher 52, via the press nose 56 until the pusher 52 is in contact with the surface 200. A predetermined reduced force is maintained on the pusher 52.

In this position, subsequently called a reference position, the pusher 52 and the supporting part 112 are flush.

The relative position of the feeler 142 relatively to the fixed body 140 corresponding to this reference position is recorded by the processor 42.

Figure 7:
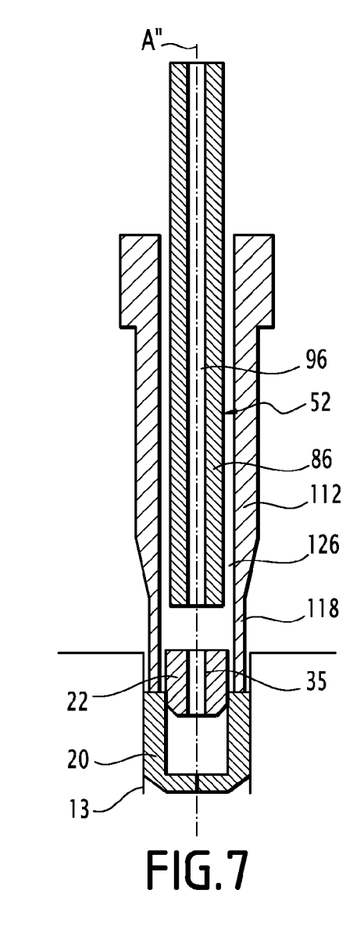

During a centering step, the pin 22 is laid into the bore 24 of the socket, and the plugging device 36 is positioned plumb with the conduit 1.

The camera 160 acquires images of the pin 22, of the socket 20 and of the end 13 of the conduit 1, and transmits these images to the computer 44.

The computer 44 then localizes, from each image received from the camera 160, the contours of the pin 22, of the socket 20 and of the end 13 of the conduit 1, and determines from these contours the position of the axis A relatively to the axis A" of the pusher.

The display device 46 at each instant displays the image stemming from the camera 160 at this instant, and superposes to each image the recorded reference image representative of the axis A".

The user then radially moves the press relatively to the conduit, until the axes A and A" are aligned, as illustrated in FIG. 7.

Figure 8:
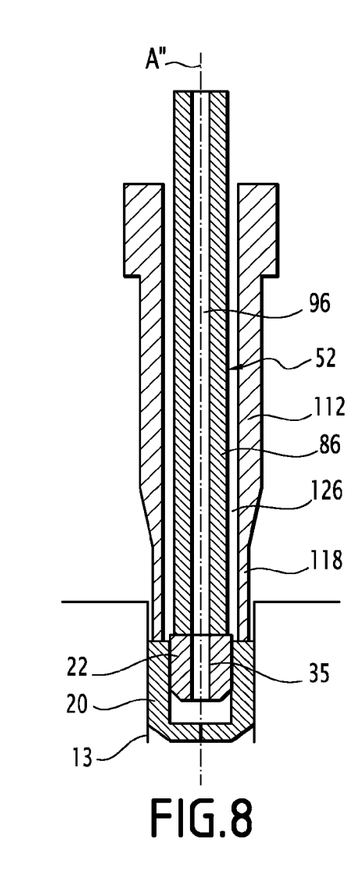

During a plugging step, the user actuates the press downwards until the supporting part 112 bears against the transverse edge 27 of the socket 20. The supporting body 60 is then maintained fixed in translation relatively to the socket 20.

The guiding portion 118 of the supporting part 112 then surrounds the pin 22.

The user then actuates the press for driving the pusher 52 downwards. Gradually as this movement is performed, the pusher 52 comes into contact with the upper wall 22c of the pin 22 and then exerts pressure on the pin 22, thereby driving it into the bore 24 of the socket 20, as illustrated in FIG. 8.

As the pin 22 is gradually driven in by the pusher 52, the displacement sensor 62 at each instant determines the relative position of the feeler 142 relatively to the body 140 of the sensor, and transmits to the processor 42 a signal representative of this position.

The processor 42 infers therefrom at each instant the relative displacement of the pusher 52 relatively to the supporting body 60 from the rated state, and thus determines the relative position of the pusher 52 relatively to the supporting part 112 with respect to the reference position.

Since the pusher 52 and the supporting part 112 respectively bear against the upper wall 22c of the pin 22 and the transverse edge 27 of the socket 20, the relative position of the pusher 52 relatively to the supporting part 112 is equal to the depth of the pin 22 relatively to the socket 20.

The display device 46 displays this depth intended for the user. Thus, upon actuation of the press, the user at each instant has the available depth of the pin 22 relatively to the socket 20, which allows him/her to actuate the press until the depth determined by the processor 42 is equal to the set depth.

The user then actuates the press for raising the pusher away from the pin 22.

Next, during a control step, the user again lowers the pusher 52 into contact with pin 22, with a reduced force, identical to the force applied during the calibration step, applied on the pusher 52 by the press.

The depth of the pin 22 relatively to the socket 20 is again determined by means of the displacement sensor 62, and compared with the set depth.

There may exist a gap between the depth attained by the pin 22 after raising the press, called a final depth, and the depth of the pin determined during the control step, called a control depth.

This deviation is due to the fact that the final depth is determined under a force, the device 36 and the pin 22 being subject to elastic deformations, while the control depth is determined under reduced force, without any elastic deformations.

However, this deviation is small and may be quantified. Thus, the set depth is advantageously determined, from the desired depth, for integrating this deviation, so that the control depth is substantially equal to the desired depth.

However, it should be understood that the exemplary embodiment shown above is not limiting.

Notably, when an alternative of the embodiment described with reference to FIGS. 3 to 8, the press is a motor-driven press, and the plugging device 36 further includes a press control unit, able to receive from the processor 42 the instantaneous depth of the pin 22 relatively to the socket 20 and to automatically actuate the press depending on this instantaneous depth.

The control unit is thus able to actuate the press downwards while the instantaneous depth of the pin 22 has not attained the set depth, and to raise the press when the set depth is reached.

Moreover, the press control unit is able to receive from the computer 44 the position of the axis A relatively to the axis A" of the pusher 52, and to radially actuate the press depending on this position for aligning the axes A and A".

Thus, in order to plug the conduit, the press is not actuated manually by a user but automatically.

Figure 9:
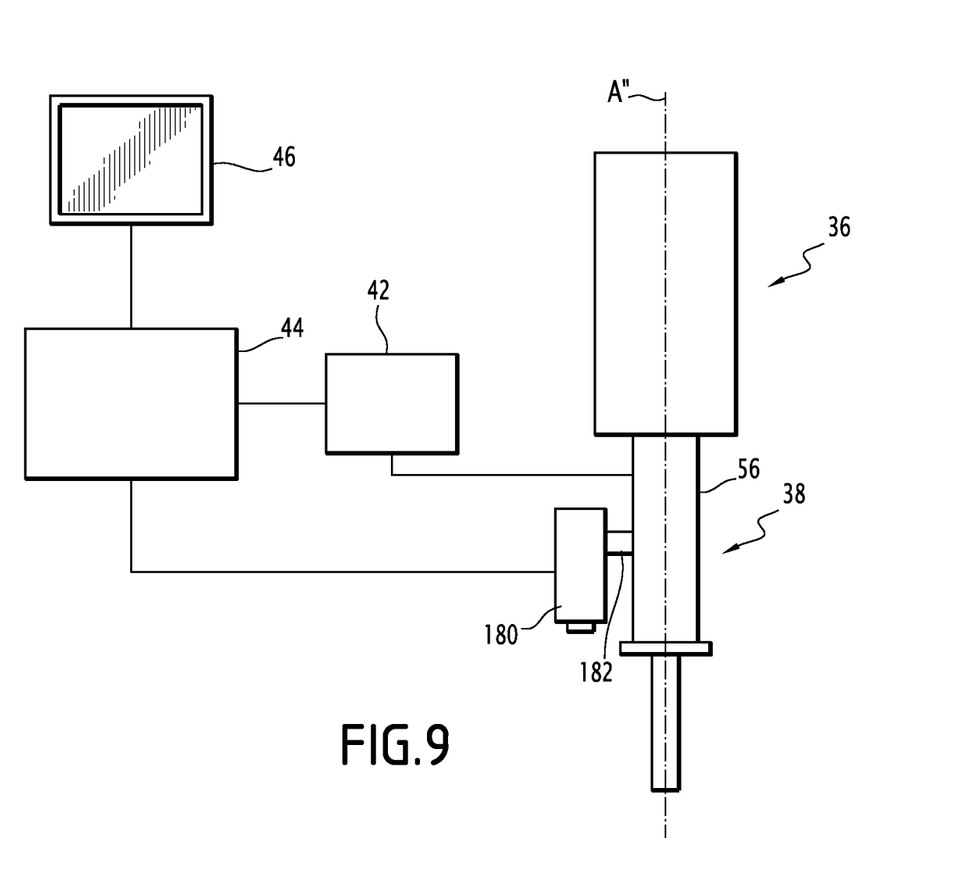
FIG. 9 is a schematic view of a plugging device according to an alternative of the embodiment of FIGS. 3 to 8.

Moreover, according to another alternative, illustrated in FIG. 9, the fiberscope 162 and the camera 160 of the centerer are replaced with a camera 180 positioned in the neighborhood of the plugging device 36, so as to acquire at each instant an image of the pin 22, of the socket 20 and of the end 13 of the conduit 1 when the pusher 52 is positioned plumb with the pin 22.

The camera 180 is for example attached to the press nose 56 by a supporting part 182. It is able to transmit the acquired images to the computer 44.

The camera 180 may further be used at the end of the driving-in of the pin 22, in order to visually check the quality of the laying of the plug 2.

For example, at the end of this driving-in, the camera 180 is moved relatively to the conduit 1 so as to be positioned plumb with the plugged end 13, and thus provide an image of this plugged end.

This embodiment gives the possibility of providing an image of better quality. It also allows improvement in the adaptability of the plugging device to different types of plugs. Indeed, the pusher 52 and the supporting part 112 may be changed without it being necessary to manipulate the centerer.

What is claimed is:

1. A plugging device for plugging an end of a conduit with a sealing plug comprising a tubular socket provided with an axial bore, inserted beforehand into the end of the conduit, and a pin intended to be axially driven into the bore of the socket in order to ensure a sealing contact between the socket and the end, the plugging device comprising:
   a driver configured to drive the pin into the bore of the socket, the driver comprising a supporting body configured to be maintained in a fixed position relatively to the socket and a pusher configured to be driven into translation along the axial direction by means of a press, the pusher being configured to exert pressure on the pin in order to generate axial displacement of the pin; and
   a determiner configured to determine an instantaneous axial position of the pin relatively to the socket as the pin is gradually driven into the bore of the socket by the driver, the determiner being configured to measure a displacement of the pusher relatively to the supporting body as the pin is gradually driven into the bore of the socket.

2. The plugging device as recited in claim 1 wherein the pusher comprises a lower segment forming a rod, the lower free end of which is intended to be applied upon the pin.

3. The plugging device as recited in claim 2 wherein the supporting body comprises a supporting part including a lower portion for guiding the rod, the lower portion being configured so as to surround the pin.

4. The plugging device as recited in claim 1 wherein the determiner comprises a displacement sensor able to determine a displacement of the pusher relatively to the supporting body as the pin is gradually driven into the bore of the socket.

5. The plugging device as recited in claim 4 wherein the driver further comprises a press nose able to be actuated by the press in order to drive into axial translation the pusher, the press nose including an axial cavity in which the displacement sensor is housed.

6. The plugging device as recited in claim 1 further comprising a centerer configured to determine a radial position of the pusher relatively to the pin.

7. The plugging device as recited in claim 6 wherein the pusher includes an axial channel, and in that the centerer includes a fiberscope received in the channel.

8. The plugging device as recited in claim 6 wherein the centerer includes a camera configured to acquire an image of the end of the conduit.

9. The plugging device as recited in claim 6 wherein the centerer is configured to compare an instantaneous radial position of the pusher relatively to the pin with a radial set position value, and to control radial displacement of the press depending on the deviation between the instantaneous radial position and the radial set position value.

10. The plugging device as recited in claim 1 wherein the determiner is configured to compare the instantaneous axial position of the pin relatively to the socket with a set position, and to control the actuation of the press depending on the deviation between the instantaneous axial position and the set position.

11. A method for plugging an end of a conduit with a sealing plug comprising a tubular socket provided with an axial bore, inserted beforehand into the end of the conduit, and a pin intended to be axially driven into the bore of the socket in order to ensure a sealing contact between the socket and the end, the method comprising:
   providing a driver comprising a supporting body and a pusher;
   driving the pin into the bore of the socket, by maintaining the supporting body in a fixed position relatively to the socket and driving the pusher into translation along the axial direction by means of a press, thereby exerting pressure on the pin to generate axial displacement of the pin; and
   determining an instantaneous axial position of the pin relatively to the socket, applied as the pin is gradually driven into the bore of the socket, by measuring a displacement of the pusher relatively to the supporting body as the pin is gradually driven into the bore of the socket.

12. The plugging method as recited in claim 11 further comprising comparing set instantaneous axial position with a set position, the driving of the pin into the bore of the socket being applied as long as the instantaneous axial position differs from a predetermined set position.

13. A plugging device for plugging an end of a conduit with a sealing plug comprising a tubular socket provided with an axial bore, inserted beforehand into the end of the conduit, and a pin intended to be axially driven into the bore of the socket in order to ensure a sealing contact between the socket and the end, the plugging device comprising:
   a driver configured to drive the pin into the bore of the socket, the driver comprising a pusher configured to be driven into translation along the axial direction by means of a press, the pusher being configured to exert pressure on the pin in order to generate axial displacement of the pin; and
   a determiner configured to determine an instantaneous axial position of the pin relatively to the socket as the pin is gradually driven into the bore of the socket by the driver, the determiner being configured to compare the instantaneous axial position of the pin relatively to the socket with a set position, and to control the actuation of the press depending on the deviation between the instantaneous axial position and the set position.

* * * * *